United States Patent [19]

Allen

[11] Patent Number: 4,906,527

[45] Date of Patent: Mar. 6, 1990

[54] BLENDS OF POLYETHERIMIDE AND ETHYLENE VINYL ACETATE COPOLYMERS

[75] Inventor: Deborah L. Allen, Dalton, Mass.

[73] Assignee: General Electric Company, Pittsfield, Mass.

[21] Appl. No.: 794,274

[22] Filed: Nov. 4, 1985

Related U.S. Application Data

[63] Continuation of Ser. No. 690,993, Jan. 14, 1985, abandoned, which is a continuation of Ser. No. 544,967, Oct. 24, 1983, abandoned.

[51] Int. Cl.$^4$ .................... C08L 77/00; B32B 27/00
[52] U.S. Cl. .................... 428/473.5; 428/500; 525/180; 525/184
[58] Field of Search .................... 525/180, 184; 428/473.5, 500

[56] References Cited

U.S. PATENT DOCUMENTS 4,376,188 3/1983 Khattab .................... 525/183
4,395,518 7/1983 Giles, Jr. et al. .................... 525/180

OTHER PUBLICATIONS

Nass, Leonard I., *Encyclopedia of PVC*, vol. 2 (1977), p. 632.
Kirk-Othmer, *Encyclopedia of Chemical Technology*, 2nd Ed., vol. 21, p. 346, date unavailable.
Kirk-Othmer, *Encyclopedia of Chemical Technology*, 2nd Ed., vol. 14, p. 218, no date available.
Duncan, R. E., "Ethylene-Vinyl Acetate", *Modern Plastics Encyclopedia*, 58(10A): 72-73, Oct. 1981.

*Primary Examiner*—Melvyn I. Marquis
*Assistant Examiner*—A. Carrillo
*Attorney, Agent, or Firm*—Bernard, Rothwell & Brown

[57] ABSTRACT

Homogenous blends of polyetherimide polymers and ethylene vinyl acetate copolymers prepared by solution blending techniques or melt blending are characterized by high impact strengths. Further disclosed are laminates of polyetherimide and ethylene vinyl acetate copolymers that are characterized by strong bonding strengths between the layers of the laminates.

11 Claims, No Drawings

BLENDS OF POLYETHERIMIDE AND ETHYLENE VINYL ACETATE COPOLYMERS

This is a continuation of application Ser. No. 690,993 filed January 14, 1985, now abandoned, which is a continuation of Serial No. 544,967, filed Oct. 24, 1983, now abandoned.

This invention is concerned with a new class of polyetherimide-ethylene vinyl acetate copolymer blends. These blends exhibit higher impact strengths than those associated with the polyetherimide component of the blends.

The novel polyetherimide-ethylene vinyl acetate copolymers comprise (A) a polyetherimide of the formula

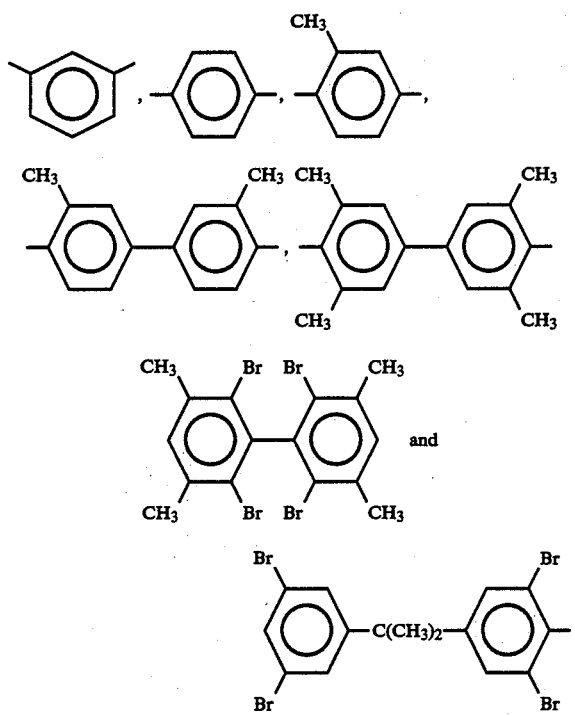

wherein a represents whole number in excess of 1 (e.g. from 10 to about 10,000 or more), the —O—Z—O— group is in the 3,3'-, 3,4'-, 4,3'-, or 4,4'- positions, and Z is a member of the class consisting of (1).

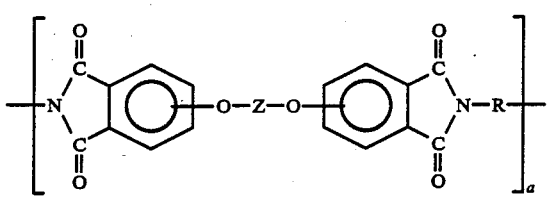

and (2) divalent organic radicals of the general formula:

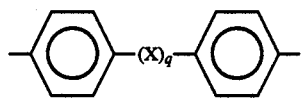

where X is a member selected from the class consisting of divalent radicals of the formulas

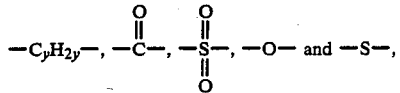

where q is 0 or 1, y is a whole number from 1 to about 5, and R is a divalent organic radical selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, C(2-8) alkylene termianted polydiorganosiloxanes, and (c) divalent radicals included by the formula

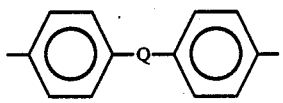

where Q is a member selected from the class consisting of

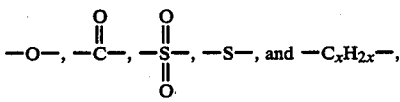

where x is a whole number from 1 to about 5 inclusive, and (B) a copolymer of ethylene vinyl acetate.

The ethylene vinyl acetate copolymers employed in the blends of the present invention can vary with respect to the ethylene to vinyl acetate ratio and the molecular weight of the polymer. Typically, ethylene vinyl acetate copolymers containing from about 10% by weight to about 50% by weight vinyl acetate can be employed in the compositions of this invention. Preferred polymers contain from about 25 wt. % to about 45 wt. % vinyl acetate.

The molecular weight of the ethylene vinyl acetate copolymers employed in these blends is conveniently represented by the so-called melt index (ASTM B-1238). Determination of this index involves measurement of the rate of extrusion of molten resins through a die of a specified length and diameter under prescribed conditions of temperature, load, and piston position in the barrel as the timed measurement is being made. The melt index of the ethylene vinyl acetate copolymer generally ranges from about 0.10 to about 20, preferably from about 0.10 to about 0.50, most preferably about 0.15.

The ethylene vinyl acetate copolymers employed in the blends of this invention are presently commercially available products. For example, such copolymers are sold by Mobay Chemical Corporation, Pittsburgh, Pensylvania under the trademark Levapren 450. Ethylene vinyl acetate is prepared from the copolymerization of ethylene and vinyl acetate and is formed by either free radical or ionic polymerization teachings known to those skilled in the art. See "Encyclopedia of Polymer Science and Technology", Vol. 15, pp. 577–677 (1971) for typical methods of preparation of ethylene-vinyl acetate copolymers. Levapren 450 P contains approximately 55% ethylene and 45% vinyl acetate. Levapren 450 P is soluble in most organic solvents, such as tertbutanol, higher ketones and halogenated hydrocarbons, but insoluble in lower alcohols and acetone. Another commerically available ethylene vinyl acetate copolymer is Elvaloy®, produced by E.I. DuPont di Nemours, Wilmington, Delaware, U.S.A. Elvaloy includes compatibility inducants and is sold in various grades, the most desirable of which for the blends of the present invention being Elvaloy 837.

The polyetherimides described above can be obtained by any of the methods well known to those skilled in the art, including the reaction of aromatic bis(ether anhydrides) of the formula

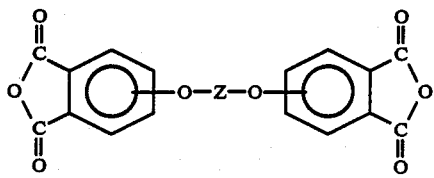

where Z is defined as above, with an organic diamine of the formula

$H_2N-R-NH_2$ where R is as defined above. In general, the reactions can be advantageously carried out employing well-known solvents, e.g., o-dichlorobenzene, m-cresol/toluene, and the like, at elevated temperatures from about 100° C. to about 250° C. Alternatively, the polyetherimides can be prepared by melt polymerization of an aromatic bis (ether anhydride) with an organic diamine, as described above, while heating the mixture of the ingredients to an elevated temperature with concurrent mixing. Generally, melt polymerization temperatures between about 200° to about 400° C. and preferably about 230° C. to about 300° C. can be employed. Any order of addition of chain stoppers ordinarily employed in melt polymerization can be employed. The conditions of the reaction and the proportions of ingredients can be varied widely depending on the molecular weight, intrinsic viscosity, and solvent resistance. In general equimolar amounts of organic diamine and bis (ether anhydride) are employed for high molecular weight polyetherimides. However, in certain instances, a slight molar excess (about 1 to 5 mole %) of diamine can be employed, resulting in the production of polyetherimides having terminal amine groups. Generally useful polyetherimides (hereinafter sometimes referred to as PEI) have an intrinsic viscosity greater than 0.2 deciliters per gram preferably 0.3 to 0.60, or 0.7 deciliters per gram or even higher when measured in m-cresol at 25° C.

Included among the many methods of making the above-identified polyetherimides are those disclosed in U.S. Patents to Heath et al. 3,847,867, Williams 3,847,869, Takekoshi et al. 3,850,885, White 3,852,242 and 3,855, 178, etc. These disclosures are incorporated herein in their entirety by reference for the purpose of teaching, by way of illustration, general and specific methods for preparing polyetherimides suited to the practice of this invention.

The aromatic bis(ether anhydride)s employed as starting materials for the polyetherimides include, for example, 2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride; etc.
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc. and mixtures of such dianhydrides.

Additionally, aromatic bis(ether anhydride)s are shown by Koton, M.M.; Florinski, F.S.; Bessonov, M.I.; Rudakov, A.P. (Institute of Heteroorganic Compounds, Academy of Sciences, U.S.S.R.), U.S.S.R. 257,010, Nov. 11, 1969, Appl. May 3,1967. In addition, dianhydrides are shown by M M. Koton, F.S. Florinski, *Zh. Org. Khin.*, 4(5), 774 (1968).

The organic diamines employed in preparing the polyetherimides include, for example,
m-phenylenediamine,
p-phenylenediamine,
4-4'-diaminodiphenylpropane,
4-4'-diaminodiphenylmethane, benzidine,
4,4'-diaminodiphenyl sulfide,
4,4'-diaminodiphenyl sulfone,
4,4'-diminodiphenyl ether,
1,5-diaminophthalene,
3,3'-dimethylbenzidine,
3,3'-dimethoxybenzidine,
2,4-bis(β-amino-t-butyl)toluene,
bis(p-β-amino-t-butylphenyl)ether,
bis(p-β-methyl-o-aminopentyl)benzone,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methyoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine, nonamethylenediamine,
decamethylenediamine,
bis(3-aminopropyl)tetramethyldisiloxane,
bis(4-amiobutyl)tetramethyldisiloxane, etc.,
and mixtures of such diamines.

The polyetherimides and ethylene vinyl acetate copolymers are compatible with each other within the ranges of proportions contemplated in the present invention. Generally, the blends of this invention employ from about 3 wt. % to about 15 wt. % ethylene vinyl acetate copolymer, the balance being essentially polyetherimide. In preferred blends, the concentration of ethylene vinyl acetate copolymer ranges from about 5% to about 12% by wt., preferably about 10% by wt. Blends within these proportions have been found to have improved impact strengths, as compared to unmodified polyetherimides.

The compatibility of polyetherimides and ethylene vinyl acetate copolymers has been employed advantageously for the preparation of laminates of these polymers. Compression molded films of ethylene vinyl acetate and polyetherimides exhibit high peel strengths. These laminates can be employed in any of a variety of applications where a relatively solft, rubbery surface is desired on a hard, rigid plastic. Examples of such applications include fittings and the like to be sealed into an orifice, or doors or windows for which tight seals are desirable, e.g., microwave oven doors. The following examples further illustrate the present invention, but are not intended to be limiting.

EXAMPLE I 10 parts of polyetherimide of the above formula, wherein Z represents a group of the formula

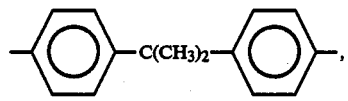

the phthalic anhydride groups are substituted in the 4,4'-positions, and R represents m-phenylene were mixed with 1 part of ethylene vinyl acetate copolymer having a melt index of 0.15. These polymers were mixed by melting the polyetherimide in a blade type mixer and then lowering the temperature to just above the glass transition temperature. At this point, the ethylene vinyl acetate copolymer was added and the material was blended. The resulting blend was then compression molded into ⅛ inch sheets. These sheets were cut into bars measuring 2½ inches by ½ inch, which were notched and tested by the standard notched Izod impact test. Unmodified polyetherimide of the same formula was also subjected to this test as a control. The notched Izod test was conducted substantially as described in ASTM test D256. The impact strength of the ethylene vinyl acetate copolymer/polyetherimide blend was determined to be 1.4 foot-pounds per inch, whereas the impact strength of the unmodified polyetherimide was determined to be 0.6 foot-pounds per inch.

The glass transition temperatures ($T_g$) of the unmodified polyetherimide and the ethylene vinyl acetate/polyetherimide blend were measured to be 214° C. in both samples. The single glass transition temperature is an indication of compatibility between the two polymers.

EXAMPLE II

Film castings of blends of polyetherimide and ethylene vinyl acetate copolymers were prepared by preparing 10% solutions of each of the polymers in chloroform and by mixing them to form the desired ratio. A 22:1 blend of polyetherimide to ethylene vinyl acetate (Elvax 837) was prepared and a film was cast by spreading the solution on a Mylar® sheet followed by air evaporation of the solvent. The resulting film was removed from the Mylar and was inspected. The film was transparent, evidencing compatibility of the two polymers. A second film was cast from a chloroform solution of 6.2:1 blend of polyetherimide to ethylene vinyl acetate copolymer (Levapren 450 N), which also was transparent and demonstrated compatibility of those two polymers.

EXAMPLE III

Sheets of polyetherimide as described in Example I were cast and compression molded with sheets of ethylene vinyl acetate copolymer (Elvax 837). Approximately 50 g of each resin was compression molded between flat plates to form sheets 10 to 20 mils thick. Sheets of the two polymers were then compression molded together leaving one end unlaminated. The force required to peel apart the resulting laminate was measured to be between 5 and 10 lbs. per inch, demonstrating good cohesion and compatibility between the polymers.

I claim:

1. A polyetherimide-ethylene vinyl acetate copolymer blend comprising: (A) from about 85 wt. & to about 97 wt % of a polyetherimide of the formula:
where a represents a whole number in excess of 1, —O—Z—O— is in the 3,3'-, 3,4'-, 4,3'- or 4,4'- positions and Z is a member of the class consisting of (1)

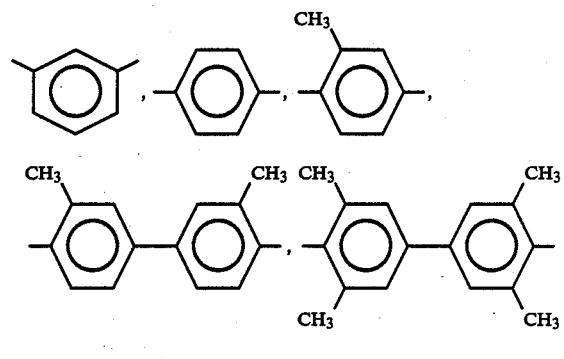

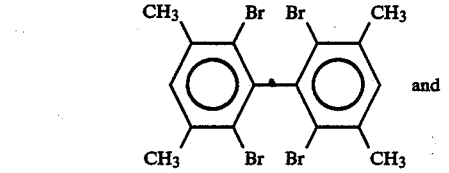
and

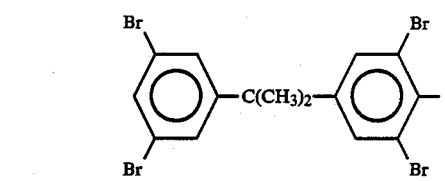

and (2) divalent organic radicals of the general formula

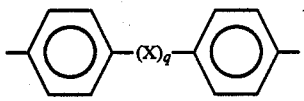

where X is a member selected from the class consisting of divalent radicals of the formula:

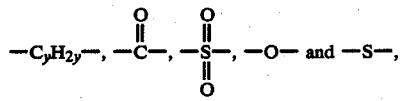

where q is 0 or 1, y is a whole number from 1 to 5, R is a divalent organic radical selected from the class consisting of (a) aromatic hydrocarbon radicals having from 6–20 carbon atoms and halogenated derivatives thereof, (b) alkylene radicals and cycloalkylene radicals having from 2 to about 20 carbon atoms, $C_{(2-8)}$ alkylene terminated polydiorganosiloxane, and (c) divalent radicals included by the formula:

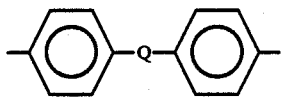

where Q is a member selected from the class consisting of

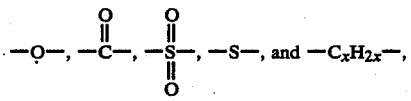

and x is a whole number from 1 to 5 inclusive, and (B) about 3 wt. % to about 15 wt. % of an ethylene vinyl acetate copolymer.

2. The blend of claim 1 comprising from about 88 wt. % to about 95 wt. % polyetherimide and from about 5 wt. % to about 12 wt. % ethylene vinyl acetate copolymer.

3. The blend of claim 1 comprising about 90 wt. % polyetherimide and about 10 wt. % ethylene vinyl acetate copolymer.

4. The blend of claim 1, 2 or 3 wherein, in the polyetherimide, Z is a group of the formula

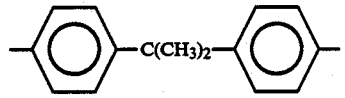

and the ethylene vinyl acetate copolymer contains from about 25 wt. % to about 50 wt. % vinyl acetate.

5. The blend of claim 4 wherein R is m-phenylene.

6. The blend of claim 1, 2 or 3, wherein the ethylene vinyl acetate copolymer contains from about 15 wt. % to about 55 wt. % vinyl acetate and has a melt index from about 0.1 to about 20.

7. The blend of claim 4, wherein the ethylene vinyl acetate copolymer and has a melt index from about 0.10 to about 4.0.

8. A laminate comprising a layer of a polyetherimide-ethylene vinyl acetate copolymer blend as defined in claim 1 and a layer of an ethylene-vinyl acetate copolymer.

9. The laminate of claim 8, wherein, in the polyetherimide, Z is a group of the formula

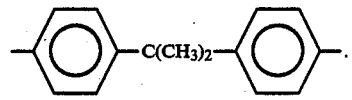

10. The laminte of claim 8 or 9, wherein the ethylene vinyl acetate copolymer contains from about 15 wt. % to about 55 wt. % vinyl acetate and has a melt index of from about 0.1 to about 20.

11. The laminate of claim 10, wherein the ethylene vinyl acetate copolymer contains from about 25 wt. % to about 50 wt. % vinyl acetate and has a melt index of from about 0.10 to about 4.0

* * * * *

UNITED STATES PATENT AND TRADEMARK OFFICE
CERTIFICATE OF CORRECTION

PATENT NO. : 4,906,527
DATED : March 6, 1990
INVENTOR(S) : Allen et al.

It is certified that error appears in the above-identified patent and that said Letters Patent is hereby corrected as shown below:

Col. 1, line 27, after "represents" insert --a--.

Col. 2, line 15, "C$_{(}$2-8)" should be --C$_{(2-8)}$--;
line 15, "termianted" should be --terminated--;
line 58, "Pen-" should be --Penn- --.

Col. 3, line 3, "commerically" should be --commercially--
line 4, "di" should be --de--;
line 59, "3,855, 178" should be --3,855,178--.

Col. 4, line 28, "May 3,1967" should be --May 3, 1967--;
line 29, " M M." should be --M.M.--;
line 39, "4,4'-diminodiphenyl" should be --4,4'-diaminodiphenyl--;
line 58, "3-methoxyhexamethylenediamine," should be --3-methoxyhexamethylenediamine,--.

UNITED STATES PATENT AND TRADEMARK OFFICE
CERTIFICATE OF CORRECTION

PATENT NO. : 4,906,527

DATED : March 6, 1990

INVENTOR(S) : Allen et al.

It is certified that error appears in the above-identified patent and that said Letters Patent is hereby corrected as shown below:

```
Col. 5,  line  4,  "bis(4-amiobutyl)tetramethyldisiloxane,"
                   should be
                   --bis(4-aminobutyl)tetramethyldisiloxane,--;
         line 25,  "solft" should be --soft--;
Col. 8,  line 37,  "laminte" should be --laminate--.
```

Signed and Sealed this

Twenty-first Day of September, 1993

Attest:

BRUCE LEHMAN

*Attesting Officer*   *Commissioner of Patents and Trademarks*